(12) United States Patent
Nakata et al.

(10) Patent No.: US 9,307,369 B2
(45) Date of Patent: Apr. 5, 2016

(54) WIRELESS POSITION DETECTION APPARATUS AND STORAGE MEDIUM

(71) Applicant: DENSO CORPORATION, Kariya, Aichi-pref. (JP)

(72) Inventors: Tsuneo Nakata, Kariya (JP); Kenji Muto, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/710,916

(22) Filed: May 13, 2015

(65) Prior Publication Data

US 2015/0334535 A1 Nov. 19, 2015

(30) Foreign Application Priority Data

May 16, 2014 (JP) ................................. 2014-102311

(51) Int. Cl.
| | |
|---|---|
| *H04W 4/04* | (2009.01) |
| *G01S 19/13* | (2010.01) |
| *G01C 21/26* | (2006.01) |
| *G01S 5/06* | (2006.01) |
| *G06F 17/30* | (2006.01) |

(52) U.S. Cl.
CPC ............ *H04W 4/046* (2013.01); *G01C 21/26* (2013.01); *G01S 5/06* (2013.01); *G01S 19/13* (2013.01); *G06F 17/30241* (2013.01)

(58) Field of Classification Search
CPC ........... G01C 21/26; G01S 19/13; G01S 5/06; G06F 17/30241; H04W 4/046
USPC ................. 701/400, 461; 455/456.5, 456.1; 340/988–996
See application file for complete search history.

(56) References Cited

U.S. PATENT DOCUMENTS

| | | | | |
|---|---|---|---|---|
| 6,243,575 | B1 * | 6/2001 | Ohyama ............... | H04W 60/04 455/456.4 |
| 6,321,090 | B1 * | 11/2001 | Soliman ................ | H04W 36/32 370/331 |
| 6,871,077 | B2 * | 3/2005 | Kennedy, Jr. ......... | H04W 64/00 342/463 |
| 7,079,844 | B2 * | 7/2006 | Furukawa ............. | H04W 16/18 370/345 |
| 7,808,900 | B2 * | 10/2010 | Suh ..................... | H04N 21/2662 370/230.1 |
| 7,852,808 | B2 * | 12/2010 | Wang ................... | H04W 36/12 370/315 |
| 9,148,867 | B2 * | 9/2015 | Nakata ................. | H04W 64/00 |
| 2002/0077122 | A1 * | 6/2002 | Yule ..................... | G08G 1/005 45/456.3 |
| 2003/0069024 | A1 * | 4/2003 | Kennedy, Jr. ......... | H04W 64/00 455/456.1 |

(Continued)

FOREIGN PATENT DOCUMENTS

JP 2013-257306 12/2013

*Primary Examiner* — Thomas Tarcza
*Assistant Examiner* — Tyler J Lee
(74) *Attorney, Agent, or Firm* — Harness, Dickey & Pierce, P.L.C.

(57) ABSTRACT

A wireless position detection apparatus specifies, on a road, a target point corresponding to a current position correspondence point of a moving object and calculates a positioning coordinate of the target point as current position information of the moving object based on (i) position information of the current position correspondence point of the moving object on the coverage map, (ii) the position information of the auxiliary points positioned immediately prior to and immediately posterior to the current position correspondence point on the coverage, and (iii) the position data of the map objects corresponding to the auxiliary points positioned immediately prior to and immediately posterior to the current position correspondence point on the coverage map.

6 Claims, 12 Drawing Sheets

(56) References Cited

U.S. PATENT DOCUMENTS

| | | | | |
|---|---|---|---|---|
| 2003/0235165 A1* | 12/2003 | Wang | ................... | H04W 36/12 370/331 |
| 2005/0226196 A1* | 10/2005 | Suh | ................... | H04N 21/2662 370/338 |
| 2009/0091439 A1* | 4/2009 | Sekiyama | .......... | G01C 21/3697 340/459 |
| 2011/0117903 A1* | 5/2011 | Bradley | .............. | H04M 1/6075 455/418 |
| 2013/0310067 A1* | 11/2013 | Nakata | .................. | H04W 64/00 455/456.1 |

* cited by examiner

FIG. 5A
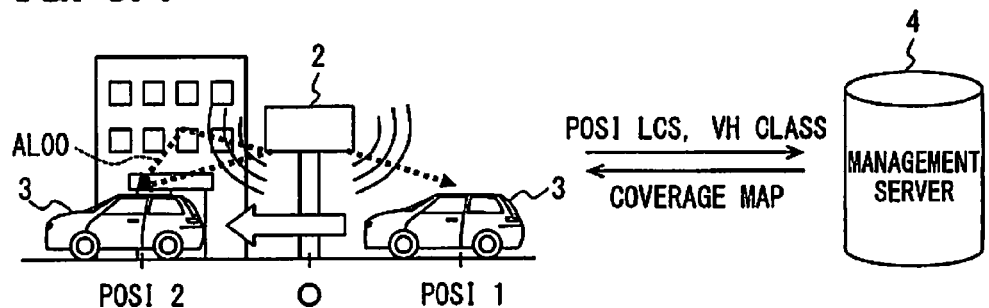
FIG. 5B
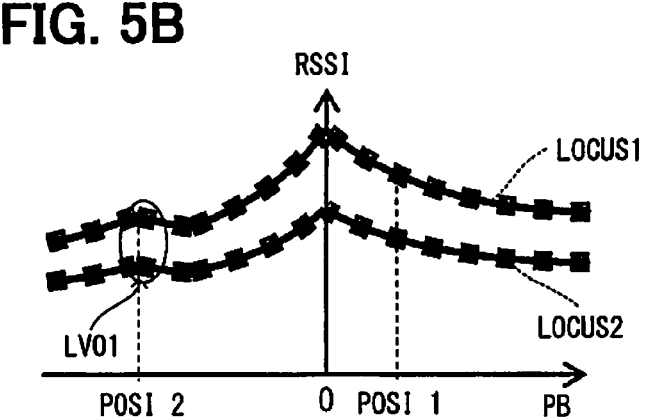
FIG. 6
| REFERENCE STATION ID | COVERAGE MAP ID | PA | PB |
|---|---|---|---|
| AP1 | M1 | (X1, Y1, Z1) | D1 |
| | | (X2, Y1, Z1) | D2 |
| | | (X3, Y1, Z1) | D3 |
| | | ... | ... |
| AP2 | M2 | (X4, Y2, Z2) | E1 |
| | | (X4, Y3, Z2) | E2 |
| | | ... | ... |

| REFERENCE STATION ID | COVERAGE MAP ID | PA | PB | INTERPOLATE INFO |
|---|---|---|---|---|
| AP | MB1 | P11 | DB1 | LEFT R40 TO P12 |
| | | P12 | DB2 | RIGHT R50 TO P13 |
| | | P13 | DB3 | STRAIGHT TO P14 |
| | | P14 | DB4 | STRAIGHT TO MAP END |
| | MB2 | P15 | EB1 | STRAIGHT TO P16 |
| | | P16 | EB2 | STRAIGHT TO MAP END |
| | ... | ... | ... | ... |

FIG. 15A

| REFERENCE STATION ID | COVERAGE MAP ID | ROAD OBJECT | PB OF REF POINT |
|---|---|---|---|
| AP1 | MB1 | L1 | S1 |
|  | MB2 | L2 | S2 |
|  | ... | ... | ... |

FIG. 15B

| ROAD OBJECT | PA | PB | INTERPOLATE INFO |
|---|---|---|---|
| L1 | P11 | SD1 (=DB1-S1) | LEFT R40 TO P12 |
|  | P12 | SD2 (=DB2-S1) | RIGHT R50 TO P13 |
|  | P13 | SD3 (=DB3-S1) | STRAIGHT TO P14 |
|  | P14 | SD4 (=DB4-S1) | STRAIGHT TO MAP END |
| L2 | P15 | SE1 (=EB1-S2) | STRAIGHT TO P16 |
|  | P16 | SE2 (=EB2-S2) | STRAIGHT TO MAP END |
|  | ... | ... | ... |

WIRELESS POSITION DETECTION APPARATUS AND STORAGE MEDIUM

CROSS REFERENCE TO RELATED APPLICATION

This application is based on Japanese Patent Application No. 2014-102311 filed on May 16, 2014, the disclosures of which is incorporated herein by reference.

TECHNICAL FIELD

The present disclosure relates to a wireless position detection apparatus detecting a position of a moving object using wireless communication with a reference station and a storage medium storing data used for the wireless position detection.

BACKGROUND

In a related art, a moving object equipped with a wireless communication device moves along a road and detects strength of radio waves transmitted from a base station. The moving object equipped with a wireless communication device is also known as a mobile station. The strength of radio waves detected by the moving object is expressed as a positioning locus of the moving object. In this related art, a position of the moving object is estimated by a map matching. In the map matching, the positioning locus of the moving object is compared with a preliminarily prepared coverage map in order to estimate the position of the moving object.

Specifically, as disclosed in JP 2013-257306 A (corresponding to US 2013/0310067 A1), in the coverage map, an area or a road having a high similarity with the positioning locus is extracted. The current position of the mobile station is specified based on position information of a predetermined feature point included in the extracted area or in the extracted road and relative position information indicating a relative position relation between the feature point and the matching point. Herein, the matching point corresponds to the current position of the moving object and also corresponds to the end point of the positioning locus.

In the related art, in some cases, the feature point does not exist due to a locational environment of the base station or the feature points are not arranged at proper intervals. In these cases, when the position specified on the coverage map generated based on the detected signal strength is matched with a position existing on a map including positioning coordinates for position detection, an accuracy of the position matching may be degraded.

SUMMARY

In view of the foregoing difficulties, it is an object of the present disclosure to provide a wireless position detection apparatus that is able to specify a position of a moving object at a high accuracy based on a position detection result detected on a coverage map. It is another object of the present disclosure to provide a storage medium storing data used for high-accuracy wireless position detection.

According to a first aspect of the present disclosure, a position detection apparatus equipped to a moving object includes a coverage map storing unit, a reception state detection unit, a distance detection unit, a generation unit, a determination unit, and a calculation unit. The coverage map storing unit stores a coverage map correlated to multiple map object data elements and multiple position information elements of auxiliary points. The coverage map is preliminarily prepared for a road and defining reception states of wireless signals along the road, and the wireless signals are transmitted from a wireless transmission device. The map object data elements are prepared for respective predetermined map objects positioned along the road, and each of the map object data elements includes one or more sub data elements each of which indicates a property of the corresponding map object. The one or more sub data elements include at least one position data element that expresses a position of the corresponding map object by a positioning coordinate. The predetermined map objects are correlated to the respective auxiliary points on the coverage map, and each of the auxiliary points has the position information element expressed by a relative coordinate on the coverage map. The reception state detection unit detects reception states of wireless signals transmitted from the wireless transmission device in real time. The distance detection unit successively detects moving distances of the moving object. The generation unit generates a positioning locus that indicates a relation between the moving distances of the moving object detected by the distance detection unit and the reception states of the wireless signals detected by the detection unit in real time correlated to the road travelled by the moving object. The determination unit extracts, from the coverage map, a portion as a target portion when a shape of the positioning locus is similar to a shape of the portion of the coverage map, and the determination unit determines an end point of the target portion as a current position correspondence point of the moving object. The current position correspondence point is a point existing on the coverage map and being correlated to a current position of the moving object. The calculation unit specifies, on the road, a target point corresponding to the current position correspondence point of the moving object and calculating a positioning coordinate of the target point as a current position information element of the moving object based on (i) a position information element of the current position correspondence point of the moving object on the coverage map, (ii) the position information element of the auxiliary point positioned immediately prior to the current position correspondence point on the coverage map and the position information element of the auxiliary point positioned immediately posterior to the current position correspondence point on the coverage map, and (iii) the position data element of the map object corresponding to the auxiliary point positioned immediately prior to the current position correspondence point on the coverage map and the position data element of the map object corresponding to the auxiliary point positioned immediately posterior to the current position correspondence point on the coverage map.

With the above apparatus, a position of the moving object can be specified at a high accuracy based on a position detection result detected on a coverage map.

According to a second aspect of the present disclosure, a non-transitory computer readable tangible storage medium, which is used for wirelessly detecting a position of a moving object, includes multiple coverage maps, multiple map object data elements prepared for respective predetermined map objects positioned along each of the roads, and multiple position information elements of auxiliary points existing on each of the coverage maps. The coverage maps are preliminarily prepared for multiple roads and each of the coverage maps indicates reception states of wireless signals along the corresponding road. The wireless signals are transmitted from a wireless transmission device. The coverage maps are compared with a positioning locus of the moving object for determining a current position of the moving object. The moving object generates the positioning locus that indicate a relation between moving distances of the moving object and real time reception states of wireless signals transmitted from the transmission device. Each of the map object data elements includes one or more sub data elements each of which indicates a property of the corresponding map object, and the one or more sub data elements include at least one position data element that expresses a position of the corresponding map object by a positioning coordinate. The predetermined map objects are correlated to the respective auxiliary points on each of the coverage maps. Each of the auxiliary points has the position information element expressed by a relative coordinate on the corresponding coverage map. Each of the coverage maps is correlated to the map object data elements and the position information elements of the auxiliary points.

With the above storage medium, a position of the moving object can be specified at a high accuracy based on a position detection result detected on a coverage map.

BRIEF DESCRIPTION OF THE DRAWINGS

The above and other objects, features and advantages of the present disclosure will become more apparent from the following detailed description made with reference to the accompanying drawings. In the drawings:

FIG. 5A is a diagram showing a vehicle passing by a reference station during a travelling, and FIG. 5B is a diagram showing a coverage map prepared for the road travelled by the vehicle;

FIG. 6 is a diagram showing information stored in a map database according to a first embodiment of the present disclosure;

FIG. 15A is a diagram showing a coverage map table stored in a map database according to a third embodiment of the present disclosure, and FIG. 15B is a diagram showing a road table stored in the map database according to the third embodiment of the present disclosure;

DETAILED DESCRIPTION

The following will describe embodiments of the present disclosure with reference to accompanying drawings.

(First Embodiment)

Figure 1:
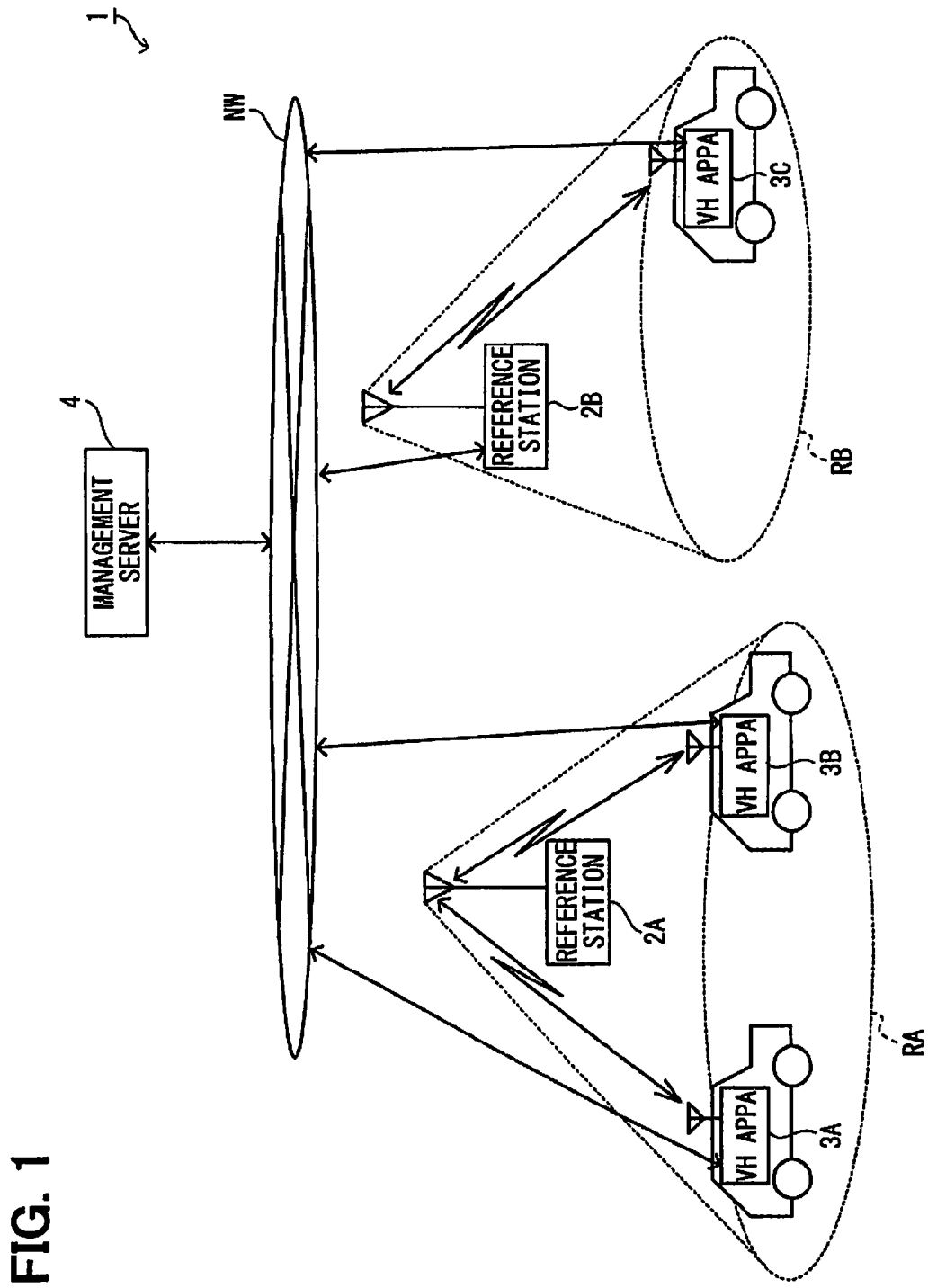
FIG. 1 is a diagram showing a configuration of a wireless position detection system according to an embodiment of the present disclosure.

As shown in FIG. 1, a wireless position detection system 1 according to the present embodiment includes multiple reference stations 2, a vehicular apparatus (VH APPA) 3 equipped to a vehicle, and a management server 4. The multiple reference stations 2 are distributed in an area where radio wave signals transmitted from positioning detection purpose satellites, such as radio wave signals from the global positioning system (GPS) satellites, cannot be received. In FIG. 1, two reference stations 2A and 2B are illustrated as examples of the multiple reference stations 2. The vehicular apparatus 3 detects a position of the vehicle by wirelessly communicating with the reference stations 2 without using the radio wave signals transmitted from the positioning detection purpose satellites. In FIG. 1, three vehicular apparatuses 3A, 3B, 3C are illustrated as examples of the multiple vehicular apparatuses 3. The management server 4 stores and performs a management to data that are necessary for the wireless position detection carried out by the vehicular apparatus 3. The vehicular apparatus 3 is provided as an example of a wireless position detection apparatus, and the vehicle is provided as an example of a moving object.

A part of the reference stations 2 may be configured to perform data communication with the management server 4 using a wide area wireless communication network NW. The wide area wireless communication network NW may be provided by a mobile phone communication network. In the present embodiment, as an example, the reference station 2B shown in FIG. 1 may be configured to perform the data communication with the management server 4 using the wide area wireless communication network NW. The reference stations 2 are positioned so that a communication range RA of one reference station 2A does not overlap with a communication range RB of another reference station 2B. At the same time, a distance between a periphery of a communication range of one reference station 2 and a periphery of a communication range of another reference station 2 is equal to or shorter than a threshold distance. Herein, when a vehicle travels out of a communication range of one reference station 2 but travels still within the threshold distance from the periphery of the communication range, the position detection result of the vehicle can be corrected to have a sufficiently high accuracy by correcting a position detection result acquired when the vehicle travelled in the communication range only with the information acquired from the devices equipped to the vehicle. That is, in this case, since the external information is not available due to a moving out of the communication range, only the multiple kinds of information detected by the vehicular devices are used for correcting the position of the vehicle. As another example, the reference stations 2 may be positioned so that a communication range of one reference station 2 overlaps with a communication range of another reference station 2.

Figure 2:
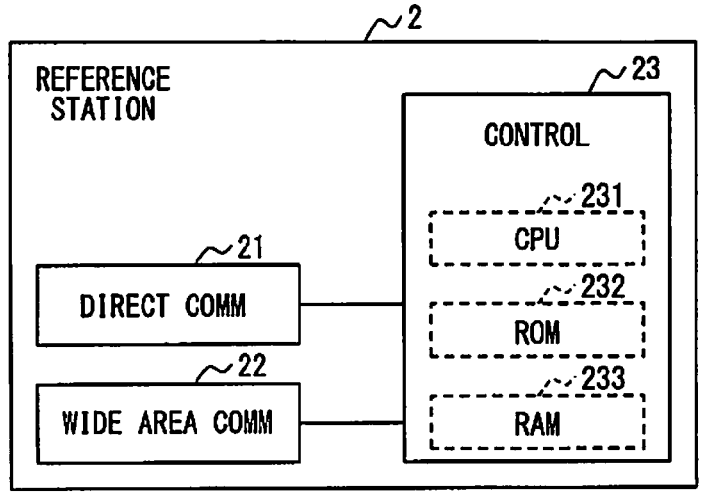
FIG. 2 is a block diagram showing a configuration of a reference station.

As shown in FIG. 2, the reference station 2 includes a direct wireless communication device (DIRECT COMM) 21, a wide area wireless communication (WIDE AREA COMM) device 22, and a control unit (CONTROL) 23.

The direct wireless communication device 21 performs a wireless communication with the vehicular apparatus 3. This wireless communication is also referred to as a direct wireless communication.

The wide area wireless communication device 22 performs the data communication with the management server 4 via the wide area wireless communication network NW. Some reference stations 2, such as the reference station 2A shown in FIG. 1 does not include the wide area wireless communication device 22. That is, only a part of the reference stations 2 include the wide area wireless communication devices 22. In the example shown in FIG. 1, among two reference stations 2A and 2B, only the reference station 2B has the wide area wireless communication device 22 and performs the data communication with the management server 4, and the reference station 2A does not have the wide area wireless communication device 22.

The control unit 23 includes a central processing unit (CPU) 231, a read only memory (ROM) 232, a random access memory (RAM) 233. The CPU 231 executes programs stored in the ROM 232 to provide various kinds of functions.

The CPU 231 executes a beacon transmission process. In the beacon transmission process, the CPU 231 controls the direct wireless communication device 21 to transmit radio wave signals at predetermined time intervals to vehicles included in the communication range of the direct wireless communication device 21. The radio wave signals transmitted from the direct wireless communication device 21 are also referred to as beacon signals, and each beacon signal includes ID of the corresponding reference station 2.

In the following example, suppose that the vehicle travels within the communication range of one reference station 2 along a road included in the communication range.

Figure 3:
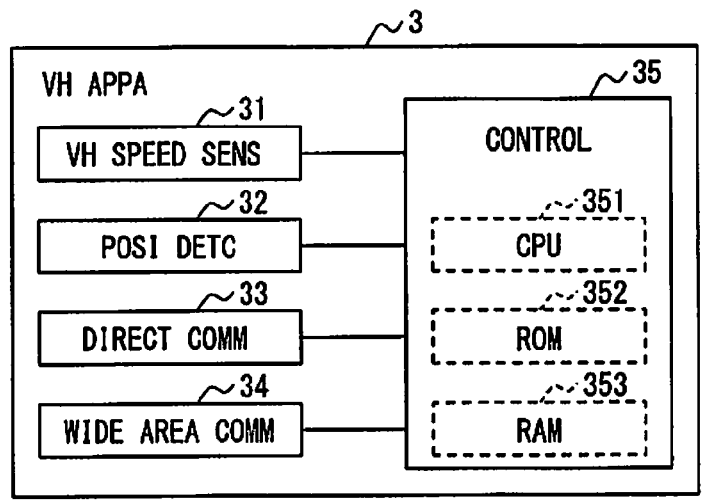
FIG. 3 is a block diagram showing a configuration of a vehicular apparatus.

As shown in FIG. 3, the vehicular apparatus 3 includes a vehicle speed sensor (VH SPEED SENS) 31, a position detector (POSI DETC) 32, a direct wireless communication device (DIRECT COMM) 33, a wide area wireless communication device (WIDE AREA COMM) 34, and a control unit (CONTROL) 35.

The vehicle speed sensor 31 detects a speed of a subject vehicle. Herein, the subject vehicle is a vehicle that is equipped with the vehicular apparatus 3. The vehicle speed sensor 31 outputs the detected speed of the vehicle to the control unit 35.

The position detector 32 includes at least a GPS receiver that receives radio wave signals from GPS satellites, a distance sensor that detects a travelling distance of the subject vehicle based on a rotation speed of a wheel of a vehicle, and a direction sensor detecting a travelling direction of the vehicle. The position detector 32 detects a position and a travelling direction of the subject vehicle based on signals output from the GPS receiver and the multiple sensors. The position detector 32 outputs the detected position of the subject vehicle to the control unit 35.

The direct wireless communication device 33 performs a direct wireless communication with the reference station 2. The wide area wireless communication device 34 performs a data communication with the management server 4 via the wide area wireless communication network NW.

The control unit 35 includes a CPU 351, a ROM 352, and a RAM 353. The CPU 351 executes programs stored in the ROM 352 to provide different kinds of functions to the vehicular apparatus 3. Specifically, the CPU 351 executes position estimation process for estimating a position of the vehicle, specifically a current position of the vehicle. In the position estimation process, the CPU 351 estimates the position of the vehicle based on wireless position detection. Herein, the wireless position detection is carried out based on only information acquired by the direct wireless communication device 33 and the wide area wireless communication device 34. That is, the CPU 351 estimates the position of the vehicle without using any information from the satellites for position detection purpose. As described above, the direct wireless communication device 33 acquires various kinds of information by performing wireless communication with the reference station 2, and the wide area wireless communication device 34 acquires various kinds of information by performing wireless communication with the management server 4 via the wide area wireless communication network NW.

Figure 4:
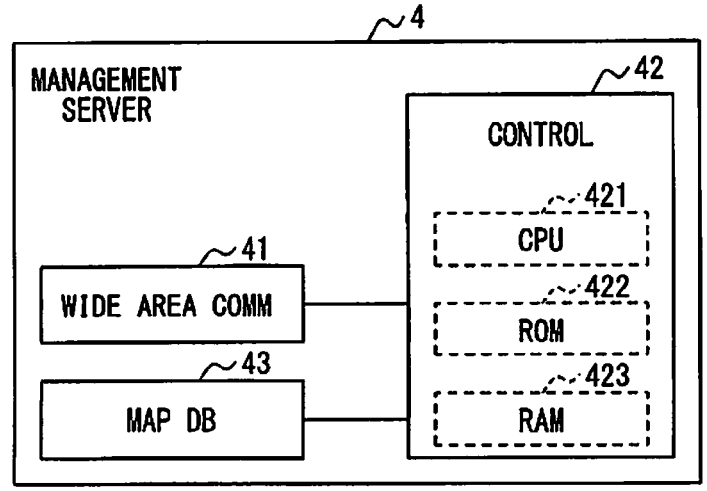
FIG. 4 is a block diagram showing a configuration of a management server.

As shown in FIG. 4, the management server 4 includes a wide area wireless communication device (WIDE AREA COMM) 41, a control unit (CONTROL) 42, and a map database (MAP DB) 43.

The wide area wireless communication device 41 performs data communication with the reference station 2 via the wide area wireless communication network NW, and also performs data communication with the vehicular apparatus 3 via the wide area wireless communication network NW.

The control unit 42 includes a CPU 421, a ROM 422, and a RAM 423. The CPU 421 executes programs stored in the ROM 422 to provide different kinds of functions. Specifically, the CPU 421 executes a coverage map update process and an information providing process. In the map update process, the CPU 421 updates a coverage map based on the information collected by the wide area wireless communication device 41. The wide area wireless communication device 41 collects the information transmitted from the reference station 2. In the information providing process, the CPU 421 provides information related to the coverage map in response to a request from the vehicular apparatus 3. Specifically, the CPU 421 receives the request from the vehicular apparatus 3 via the wide area wireless communication device 41.

The map database 43 may be provided by a non-volatile memory, and stores information necessary for the wireless position detection executed by the vehicular apparatus 3.

Specifically, the map database 43 at least stores (i) map data related to a map and including multiple map objects having respective positioning coordinates, (ii) multiple coverage maps prepared for respective roads existing on the map, and (iii) a coverage map table including various kinds of information related to the multiple coverage maps. The positioning coordinates of the multiple map objects are coordinates used for specifying the position of the map objects on the map, for example, on a navigation map used in a navigation system. As one example of the positioning coordinate, three dimensional coordinate defined with reference to a predetermined coordinate system may be used. Hereinafter, the map related to the map data including three dimensional coordinates of respective map objects is also referred to as a street map in order to differentiate from the coverage map. Hereinafter, the coverage map together with the coverage map table is referred to as coverage map related information. For example, the map data may be included in the coverage map related information.

The map data at least includes road data indicating a road shape and a connection state of the roads and object data indicating respective predetermined map objects existing on the street map. The road may also be treated as map object. The map object may be a point on the street map or a building existing on the street map. The object data includes various kinds of information indicating a property of corresponding map object. The various kinds of information of the object data at least includes position information that indicates a position of corresponding map object. The position information is expressed by positioning coordinates PA of the corresponding map object. Herein, the positioning coordinates of the map object is used for detect a position of the object on the street map. When the map object on the street map is a building that has spatial dimensions other than a point, the position information indicates a position of a representative point of the building.

As shown in FIG. 5A and FIG. 5B, a coverage map shown in FIG. 5B is preliminarily prepared for a road passing by a reference station 2 based on a detection of the beacon signals transmitted from the reference station. In FIG. 5A, a point closest to the reference station 2 on the road is also referred to as origin point O.

The coverage map includes multiple probe levels of the beacon signals transmitted from the reference station 2, and the multiple probe levels of the beacon signals are detected at respective points along the road. A position of each point along the road is expressed by relative coordinate PB with reference to the origin point on the coverage map as shown in FIG. 5B. That is, a relative coordinate of the origin point O on the coverage map is set as zero (PB=0). The coverage map includes one or more coverage map loci as shown in FIG. 5B.

In the present embodiment, a received signal strength indicator RSSI is detected as the probe level of the beacon signal transmitted from the reference station 2. Herein, RSSI indicates strength of the beacon signal, which is transmitted from the reference station 2 and is received by the vehicular apparatus 3. The coverage map is generated by plotting the multiple RSSI corresponding to the relative coordinate of each detection point travelled by the vehicle. Herein, the relative coordinate PB of each detection point is a distance from the detection point to the origin point on the coverage map.

Usually, in the coverage map, the probe level, such as RSSI has a maximum level at the origin point (PB=0). As shown in FIG. 5B, the probe level generally decreases with an increase of the distance from the origin point O to each detection point along the road. In FIG. 5A and FIG. 5B, two points POSI1 and POSI2 are illustrated as examples of beacon signal detection points. In some cases, the probe level does not absolutely decrease with an increase of the distance from the origin point O to the detection point. As shown in FIG. 5B, at the detection point POSI2, the probe level LV01 has increased compared with a probe level detected immediately before the detection point POSI2. This is because, the probe level LV01 detected at the point POSI 2 is a total RSSI of signal components reflected on the surface of the building positioned close to the detection point and signals directly received from the reference station 2. The signal components reflected on the surface of the building and the signals directly received from the reference station 2 are shown by a circle AL00 in FIG. 5A. For another example, the origin point O may also be set to a point other than the point having the maximum probe level.

When the road existing on the street map includes multiple lanes, for example, a first lane in one direction and a second lane in an opposite direction, the multiple lanes are treated as separate roads. Thus, the coverage map is prepared for each road. More specifically, as shown in FIG. 5B, the coverage map locus LOCUS1 is prepared for the first lane of the road, and the coverage map locus LOCUS2 is prepared for the second lane of the road, which has a direction opposite to the first lane of the road. Usually, as shown in FIG. 5B, coverage map loci corresponding to multiple lanes have similar shapes, and the coverage map corresponding to one traffic lane that is closer to the reference station 2 has relatively higher probe levels compared with the coverage map loci corresponding to another lane. The coverage map may also be prepared for a class of the vehicle. Each coverage map has an identification symbol (ID) as shown in FIG. 6.

FIG. 6 shows an example of the coverage map table. In FIG. 6, multiple reference stations having respective identification symbols (ID) AP1, AP2 are shown as examples. For the reference station 2 having ID of AP1, multiple coverage maps including the coverage map M1 are respectively prepared for all of the roads included in the communication range of the reference station 2 having ID of AP1. The roads included in the communication range of the reference station 2 are able to receive the beacon signals transmitted from the reference station 2. Similarly, for the reference station having ID of AP2, multiple coverage maps including the coverage map M2 are respectively prepared for all of the roads included in the communication range of the reference station 2 having ID of AP2.

In the coverage map table, for each coverage map having a predetermined ID, multiple map objects existing along the road indicated by the ID of the coverage map are stored related to the coverage map. In FIG. 6, the map objects existing along the road corresponding to the ID of the coverage map are correlated to the coverage map. Specifically, the position information of each map object on the street map and position information of each map object on the coverage map are stored related to the corresponding coverage map in the coverage map table. Herein, the position information of each map object on the street map is provided by the positioning coordinates PA on the street map, and the position information of each map object on the coverage map is provided by the relative coordinate PB indicating a distance from the corresponding map object to the origin point O on the coverage map.

Figure 7:
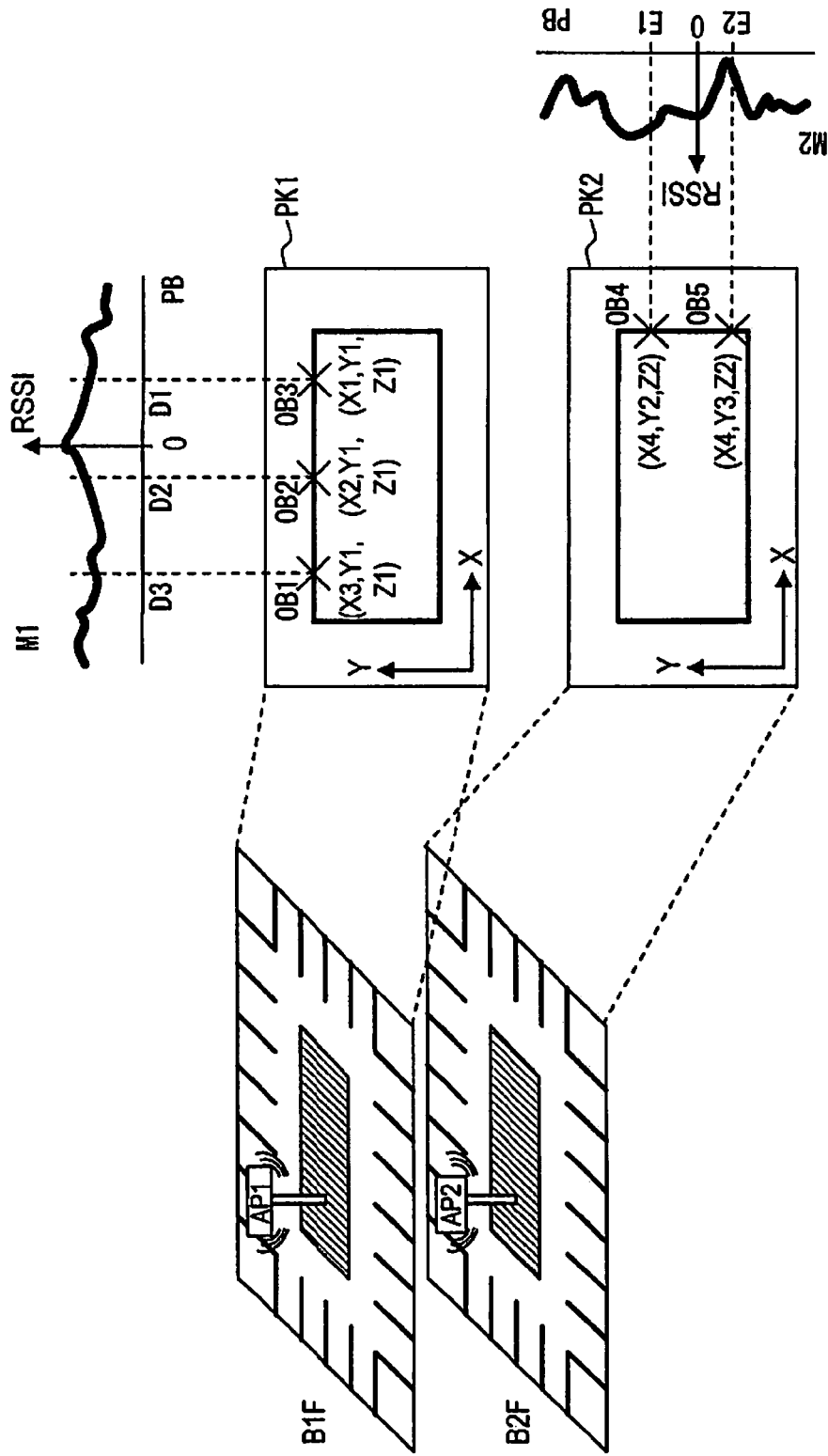
FIG. 7 is a diagram showing a relation between coverage maps and map objects, such as point objects, using an underground parking lot as an example.

For example, as shown in FIG. 7, suppose that a reference station 2 having ID of AP1 is positioned on a first basement floor B1F, and a reference station 2 having ID of AP2 is disposed on a second basement floor B2F. Parking spaces are provided on both the first basement floor B1F and the second basement floor B2F. Each of the parking space maps PK1 and PK2 corresponds to the street map. The parking space map PK1 includes a road that is able to receive the beacon signals transmitted from the reference station 2 having ID of AP1, and the parking space map PK2 includes a road that is able to receive the beacon signals transmitted from the reference station 2 having ID of AP2. The roads in both parking spaces can be travelled by the vehicle.

The road included in each parking space map may be divided into multiple segments, and the coverage map may be provided for each segment of the road. In the example shown in FIG. 7, the road included in each parking space map has a square loop shape, and is divided into four segments so that each segment corresponds to one side of the square loop shape. The division of road included in the map is not limited to the above-described example. As another example, the coverage map may be prepared for one whole road without dividing the road into multiple segments. The road may also be divided into two segments, three segments, five segments, or more segments, and the coverage maps may be prepared for each segment of the road.

In each segment of the road or in each road, multiple map objects exist along the road as shown in FIG. 7. The object data of each map object includes at least the position information of each map object. As shown in FIG. 7, a coordinate system including X axis, Y axis, and Z axis are defined so that X axis are parallel to one direction of the square loop shape of the road, Y axis are perpendicular to the X axis on a plane of the floor, and Z axis is vertical to the plane of the floor.

As shown in FIG. 7, the position information, that is, the positioning coordinates of map objects OB1 to OB3 positioned on the first basement floor B1F have the same Z coordinate, which is equal to Z1. Similarly, the positioning coordinates of map objects OB4 and OB5 positioned on the second basement floor B2F have the same Z coordinate, which is equal to Z2. On the first basement floor B1F, the positioning coordinates of the map objects OB1 to OB3 arranged along one road segment parallel to the X axis have the same Y coordinate, which is equal to Y1.

The position coordinates of the map objects OB1 to OB3 arranged along one road segment parallel to the X axis have different X coordinates, which are equal to X1, X2, X3, respectively. That is, the three dimensional coordinates of three map objects OB1 to OB3 on the first basement floor B1F are set as (X3, Y1, Z1), (X2, Y1, Z1), and (X1, Y1, Z1), respectively. On the corresponding coverage map having ID of M1, the map objects OB1 to OB3 have respective relative coordinates D1, D2, and D3.

On the second basement floor B2F, the positioning coordinates of the map objects OB4 and OB5 arranged along one road segment parallel to the Y axis have the same X coordinate, which is equal to X4. The positioning coordinates of the map objects OB4 and OB5 arranged along one road segment parallel to the Y axis have different Y coordinates, which are equal to Y2 and Y3, respectively. That is, the three dimensional coordinates of two map objects OB4 and OB5 on the second basement floor B2F are set as (X4, Y2, Z2) and (X4, Y3, Z2), respectively. On the corresponding coverage map having ID of M2, the map objects OB4 and OB5 have respective relative coordinates E1 and E2.

Figure 8:
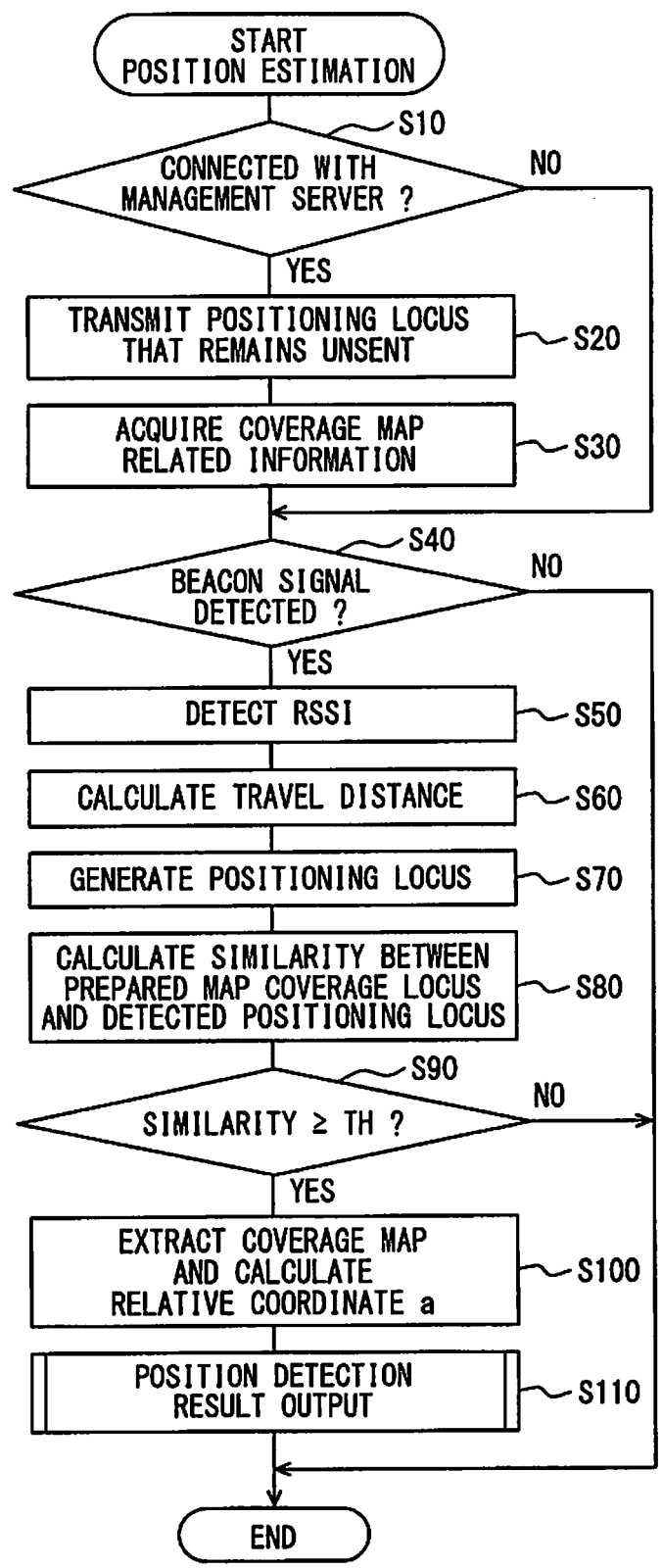
FIG. 8 is a flowchart showing a position estimation process executed by the vehicular apparatus according to the first embodiment of the present disclosure.

The following will describe the position estimation process executed by the CPU 351 of the vehicular apparatus 3 with reference to FIG. 8. The CPU 351 repeatedly executes the position estimation process from when the CPU 351 is activated until when the CPU 351 is deactivated.

When the CPU 351 starts the position estimation process, the CPU 351 determines whether the wide area wireless communication device 34 is communicably connected with the management server 4 at S10. When the CPU 351 determines that the wide area wireless communication device 34 is not communicably connected with the management server 4 (S10: NO), the CPU 351 proceeds to S40.

When the CPU 351 determines that the wide area wireless communication device 34 is communicably connected with the management server 4 (S10: YES), the CPU 351 transmits, to the management server 4, information related to positioning locus that remains unsent at S20. The positioning locus is generated at S70 based on the beacon signals transmitted from the corresponding reference station 2, and details of generation of the positioning locus will be described later. The CPU 351 further transmits the ID of the corresponding reference station 2, the class of the subject vehicle, the travelling direction of the subject vehicle, and the current time to the management server 4 together with the positioning locus.

At S30, the CPU 351 acquires, from the management server 4, one or more sets of coverage map related information of respective one or more reference stations 2. Herein, the CPU 351 only acquires the coverage map related information of the reference stations 2, which are positioned around the road being travelled by the subject vehicle and positioned from the subject vehicle within a predetermined distance. In the present embodiment, the predetermined distance is set as one kilometer. Then, the CPU 351 stores the one or more sets of coverage map related information of one or more reference stations 2 in the RAM 353, and proceeds to S40. The RAM corresponds to the coverage map storing unit.

At this time, among all sets of the coverage map related information of the reference stations 2 positioned within the predetermined distance from the subject vehicle, the vehicular apparatus 3 acquires one or more sets of the coverage map related information that are only related to the class of the subject vehicle and the travelling direction of the subject vehicle. When the vehicular apparatus 3 have acquired one coverage map related information of one reference station 2 in the past and the coverage map related information has not changed compared with the last time, the CPU 351 may cancel the repeated acquiring of the same coverage map related information.

At S40, the CPU 351 determines whether beacon signals are detected by the direct wireless communication device 33. When the CPU 351 determines that the beacon signals are not detected (S40: NO), the CPU 351 ends the position estimation process. When the CPU 351 determines that the beacon signals are detected (S40: YES), the CPU 351 detects the probe level of each beacon signal at S50. Herein, the RSSI is detected as one example of the probe level.

At S60, the CPU 351 calculates a distance travelled by the subject vehicle from when the beacon signal has been detected for the first time to the current time.

Figure 10A:
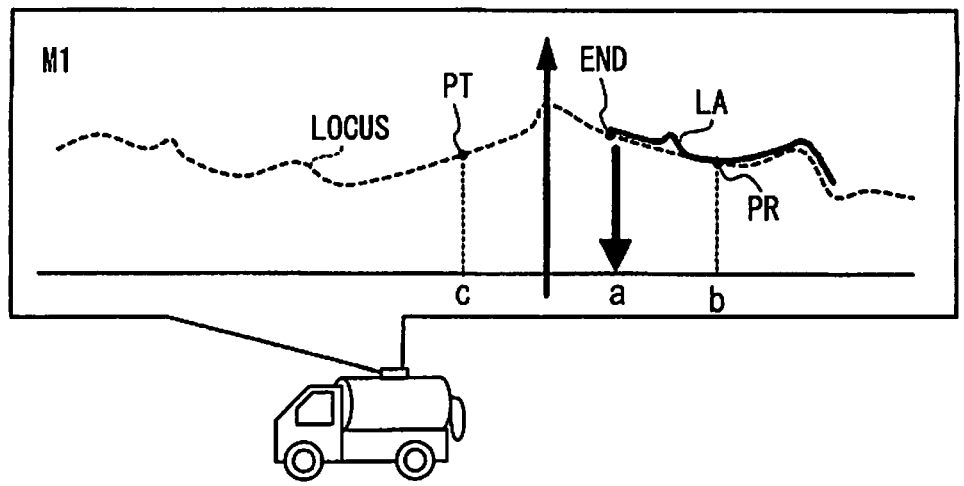
FIG. 10A is a diagram showing a method for specifying a current position of a moving object.

At S70, the CPU 351 generates the positioning locus LA that indicates a relation between the detected probe level of the beacon signal and the travelled distance of the subject vehicle as shown in FIG. 10A. The positioning locus LA includes detected probe levels and the travelled distance of the subject vehicle from when the beacon signal has been detected for the first time to the current time.

At S80, to all of the coverage maps of the one or more reference stations 2, which are acquired at S30, the CPU 351 performs a matching process to each coverage map in order to obtain a similarity between each coverage map with the positioning locus generated at S70. When performing the matching process, the CPU 351 compares one coverage map, which is acquired at S30 and corresponds to one reference station 2, with the positioning locus, which is generated at S70 based on the beacon signals transmitted from the same reference station 2. In the matching process, the CPU 351 moves the detected positioning locus LA along the coverage map locus LOCUS in an entire region of the coverage map locus. The similarity between the prepared coverage map locus and the detected positioning locus is determined at each detection point of the coverage map.

At S90, among the multiple similarities corresponding to multiple points of the coverage map, the CPU 351 determines whether one similarity is equal to or higher than a threshold value TH. When the CPU 351 determines that there is no point that has the similarity equal to or higher than the threshold value (S90: NO), the CPU 351 ends the position estimation process. At S90, when the CPU 351 determines that there exists one or more points that has similarities equal to or higher than the threshold value (S90: YES), the CPU 351 extracts a coverage map when a part of the coverage map locus LOCUS has a maximum similarity with the positioning locus LA as shown in FIG. 10A. Then, the CPU 351 sets, on the coverage map locus LOCUS, a point corresponding to an end point of the positioning locus LA as an end point END, and specifies the relative coordinate a of the END point on the coverage map as shown in FIG. 10A. Since the end point END of the coverage map locus corresponds to the current position of the subject vehicle, the end point is also referred to as a current position correspondence point.

At S110, the CPU 351 executes the position detection result output process based on the relative coordinate a and the information included in the coverage map table in order to output the position detection result of the current position of the vehicle on the map.

Figure 9:
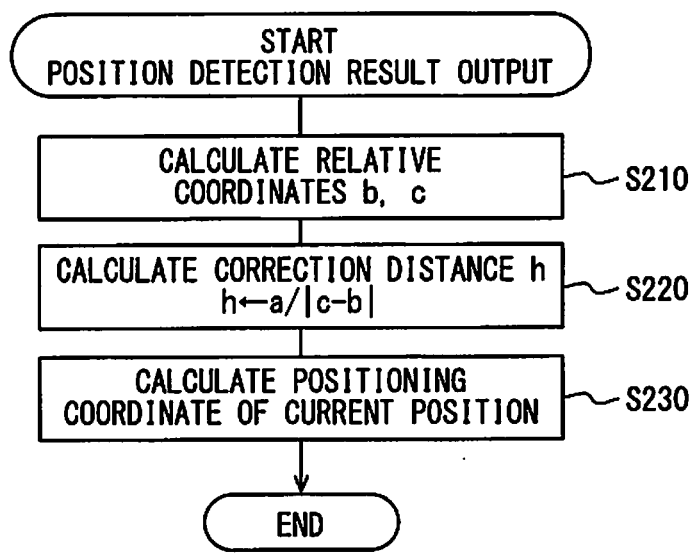
FIG. 9 is a flowchart showing a position detection result output process executed by the vehicular apparatus according to the first embodiment of the present disclosure.
Figure 10B:
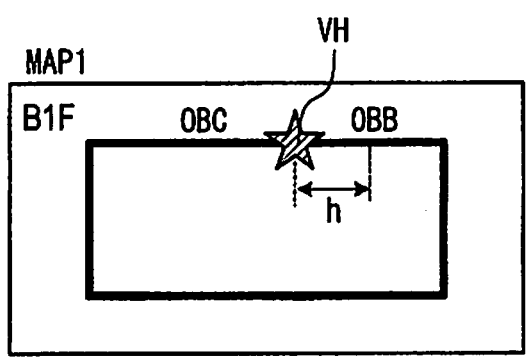
FIG. 10B is a display example for displaying the position information.

The following will describe the position detection result output process executed by the CPU 351 at S110 of the position estimation process with reference to FIG. 9, FIG. 10A, and FIG. 10B.

When starting the position detection result output process, at S210, the CPU 351 extracts a relative coordinate b of an immediately prior point PR and a relative coordinate c of an immediately posterior point PT from the coverage map table extracted at S110 of the position estimation process. The immediately prior point PR is positioned immediately prior to the end point END of the coverage map locus LOCUS along the coverage map locus LOCUS, and the immediately posterior point PT is positioned immediately posterior to the end point END of the coverage map locus LOCUS along the coverage map locus LOCUS. The immediately prior point PR and the immediately posterior point PT on the coverage map, respectively, correspond to predetermined map objects on the street map. The immediately prior point PR and the immediately posterior point PT are also referred to as auxiliary points, and the relative coordinates b, c of the immediately prior point PR and the immediately posterior point PT are also referred to as auxiliary point position information.

At S220, the CPU 351 calculates a correction distance h based on the following expression (1) and the relative coordinates a, b, c.

$$h = \frac{a}{|c-b|} \quad (1)$$

At 5230, the CPU 351 specifies, on the street map MAP1, the predetermined map objects OBB, OBC, which respectively correspond to the auxiliary points having respective relative coordinates b and c on the coverage map, as shown in FIG. 10B. Then, on the street map, along a line that connects the map object OBB with the map object OBC, the CPU 351 estimates a point distant from the object OBB by the distance h as the current position VH of the subject vehicle on the street map, and calculates the positioning coordinate of the current position VH on the street map as the position information of the subject vehicle. Then, the CPU outputs the calculated position information of the current position as position detection result. Then, the CPU 351 ends the position detection result output process.

The current position information is used for displaying the current position of the vehicle on the street map, which is displayed on a display screen.

The following will describe advantages acquired by the above-described configuration of the present embodiment. In the wireless position detection system 1, on the coverage map, a point corresponding to the current position of the subject vehicle is specified by matching the preliminarily prepared coverage map with the detected positioning locus of the vehicle. In the matching, a similarity between the coverage map and the positioning locus is determined in order to specify a coverage map section that has a similarity with the positioning locus equal to or higher than the threshold value TH. Then, on the coverage map, the auxiliary points are specified prior to and posterior to the determined current position correspondence point that correspond to the current position of the subject vehicle. Then, the predetermined map objects corresponding to the auxiliary points are specified on the street map.

The current position of the vehicle on the street map is calculated based on (i) the positional relation between the current position correspondence point and the auxiliary points on the coverage map and (ii) the position information of the auxiliary points, which are defined by the positioning coordinates.

More specifically, the current position of the vehicle on the street map is calculated based on (i) position information of the current position correspondence point of the subject vehicle on the coverage map, (ii) the position information of the auxiliary point positioned immediately prior to the current position correspondence point on the coverage map and the position information of the auxiliary point positioned immediately posterior to the current position correspondence point on the coverage map, and (iii) the position information of the map object corresponding to the auxiliary point positioned immediately prior to the current position correspondence point and the position information of the map object corresponding to the auxiliary point positioned immediately posterior to the current position correspondence point.

With above-described configuration, on the street map, the current position of the subject vehicle can be calculated with a high accuracy based on the current position information of the subject vehicle on the coverage map.

In the above wireless position detection system 1, any point along the road have been travelled by the subject vehicle can be set as the map object. Thus, the current position of the subject vehicle can be acquired at a sufficiently high accuracy regardless of the shape of the coverage map. That is, the current position of the subject vehicle can be acquired at a sufficiently high accuracy even when the coverage map does not have shape feature points.

(Second Embodiment)

The following will describe a second embodiment of the present disclosure. The following will mainly describe configuration and operation that are different from the first embodiment.

In the first embodiment, a road between the object OBB and the object OBC is approximated in order to calculate the current position information. In the present embodiment, a road between the object OBB and the object OBC is approximated based on interpolation information. Herein, the interpolation information indicates a shape of the road between the object OBB and the object OBC.

Figures 11, 13:
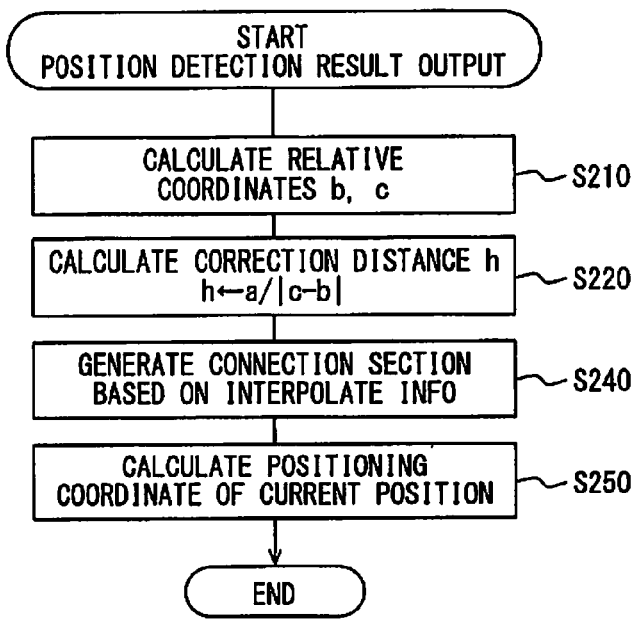
FIG. 11 is a diagram showing information stored in a map database according to a second embodiment of the present disclosure.
FIG. 13 is a flowchart showing a position detection result output process executed by a vehicular apparatus according to the second embodiment of the present disclosure.

In the present embodiment, as shown in FIG. 11, the coverage map table includes position information of map objects on the street map, relative position information of auxiliary points that exist on the coverage map and correspond to respective map objects, and interpolation information of the map objects on the street map. The interpolation information indicates an actual shape of the road from the corresponding map object to an immediately adjacent object on the street map.

In FIG. 11, each of the objects OB11 to OB16 on the street map MAP2 has position information that is indicated by respective positioning coordinates P11 to P16. As described above, three dimensional coordinate may be used as the positioning coordinate. For simplification purpose, three dimensional coordinate is expressed in a simplified way in the following description and drawings. The objects OB11 to OB16 correspond to respective auxiliary points on the coverage maps MB1 and MB2. The relative coordinates of the auxiliary points, which correspond to the objects OB11 to OB16, are DB1, DB2, DB3, DB4, EB1, and EB2. The objects OB11 to OB16 further have respective interpolation information. For example, the object OB11 has the interpolation "LEFT R40" as shown in FIG. 11. Herein, "LEFT R40" indicates the road shape has a curvature radius of 40 meters, and the immediately adjacent object is curved in a left direction with respect to the subject object.

Figure 12:
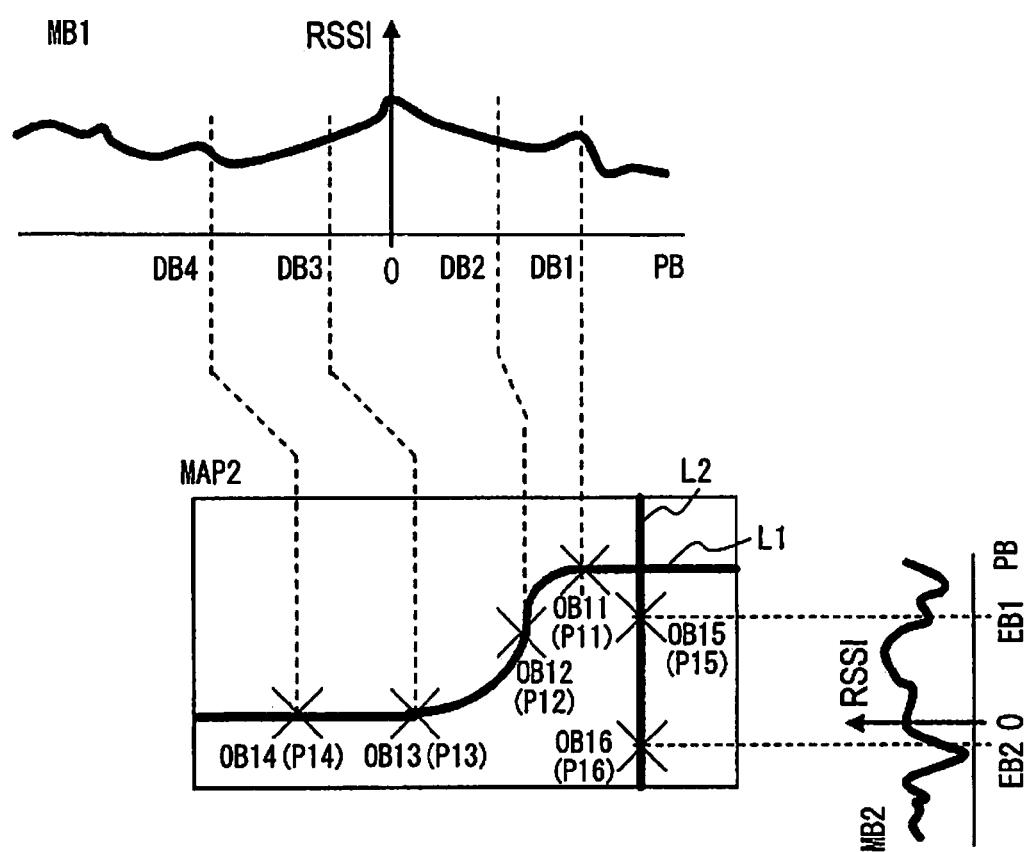
FIG. 12 is a diagram showing a relation between coverage maps and map objects, such as point objects.

In the coverage map table shown in FIG. 12, two roads L1 and L2 intersect with each other on the street map MAP2. The coverage map having ID of MB1 is correlated to the road L1, and the coverage map having ID of MB2 is correlated to the road L2. On the road L1, four objects OB11, OB12, OB13, OB14 are located in order along the road L1, and the four objects OB11, OB12, OB13, OB14 have respective map position information, respective auxiliary point information, and respective interpolation information as shown in FIG. 11. On the road L2, two objects OB15 and OB16 are located in order along the road L2, and the two objects OB15 and OB16 have respective map position information, respective auxiliary point information, and respective interpolation information as shown in FIG. 11.

Figure 14A:
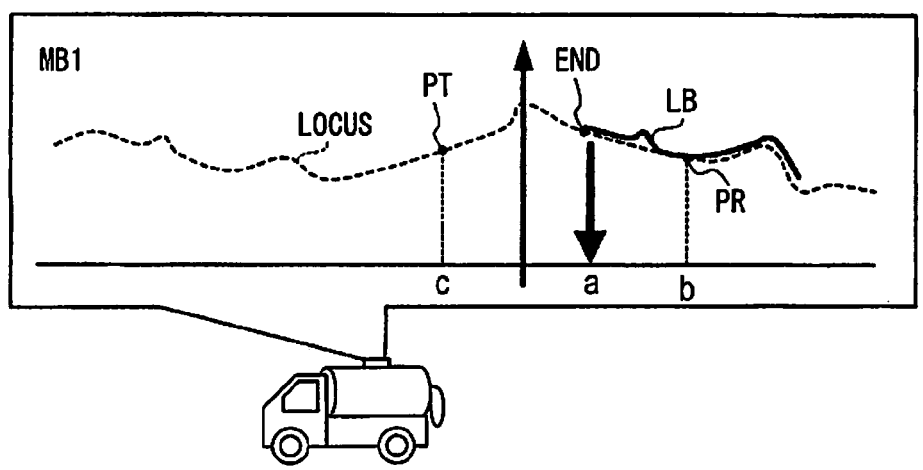
FIG. 14A is a diagram showing a method for specifying a current position of a moving object.
Figure 14B:
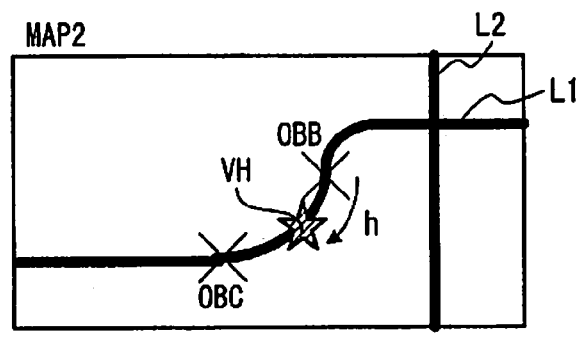
FIG. 14B is a display example for displaying the position information.

The following will describe a position detection result output process according to the present embodiment with reference to FIG. 13, FIG. 14A, and FIG. 14B. Similar to the first embodiment, the CPU 351 executes the detection result output process in the present embodiment. Hereinafter, description of the processes similar to the first embodiment will be omitted for simplification. As shown in FIG. 13, at S210 and S220, the CPU 351 executes processes similar to the first embodiment. Similar to the foregoing embodiment, the CPU 351 generates the positioning locus LB that indicates a relation between the detected probe levels of the beacon signals and the travelled distance of the subject vehicle as shown in FIG. 14A.

At S240, the CPU 351 generates a connection section that connects the object OBB with the object OBC based on the interpolation information stored in the coverage map table as shown in FIG. 14B. Herein, the connection section that connects the object OBB with the object OBC is also referred to as interpolated road.

At S250, the CPU 351 estimates a point distant from the object OBB by the distance h along the generated connection section as the current position VH of the subject vehicle. Then, the CPU 351 calculates the positioning coordinate of the current position VH of the subject vehicle as the current position information, and outputs the current position information as the position detection result indicating the current position of the subject vehicle.

As described above, in the present embodiment, the current position of the subject vehicle is calculated with consideration of the road shape between the two adjacent objects OBB and OBC. Herein, the road shape is estimated based on the interpolation information stored in the coverage map table. This configuration may further improve the detection accuracy of the current position of the subject vehicle.

(Third Embodiment)

The following will describe a third embodiment of the present disclosure. The following will mainly describe configuration and operation that are different from the second embodiment. In the present embodiment, the information stored in the map database and the position detection result output process are different from the second embodiment.

In the present embodiment, the map database 43 includes the map data, the coverage map, the coverage map table, and road table. The map data and the coverage map are similar to the foregoing embodiments, and detailed description will be omitted.

As shown in coverage map table of FIG. 15A, for each reference station 2, coverage maps are, respectively, prepared for all of the roads that are able to receive the beacon signals from the corresponding reference station 2. In FIG. 15A, the reference station having ID of AP1 is illustrated as an example. In this example, coverage maps having IDs of MB1, MB2 are prepared for respective roads L1, L2 that are able to receive the beacon signals from the reference station 2 having ID of AP1. The coverage map MB1 is correlated to the corresponding road object L1 and the corresponding reference point position information S1, and the coverage map MB2 is correlated to the corresponding road object L2 and the corresponding reference point position information S2. Herein, the road object is treated as one kind of map object, and has object data including various kinds of information that indicate various properties of the road indicated by the ID of the corresponding coverage map. The reference point position information is position information of a reference point (REF POINT) of the map coverage locus on the coverage map, and the map coverage locus on the coverage map corresponds to the road object on the street map. In the present embodiment, a predetermined start point of the map coverage locus on the coverage map is set as the reference point, and the reference point has the reference point position information S1, S2, which is expressed by the relative coordinate. The predetermined start point of the map coverage locus is also referred to as a start correspondence point.

As shown in FIG. 15B, each road object corresponds to one or more representative points that are located along the road object. Herein, the representative objects are point objects. As shown in FIG. 15B, the position information related to each representative point includes positioning coordinate PA of corresponding point object, auxiliary point position information expressed by the relative coordinate PB, and the interpolation information (INTERPOLATE INFO). As described above, the object data of corresponding point object includes various kinds of information that indicate properties of the representative point. Specifically, in the present embodiment, the object data of the point object at least includes the position information of the point object. The auxiliary point position information indicates the relative position information of the auxiliary point on the coverage map with respect to the reference point of the coverage map locus. Herein, the auxiliary points are generated by reflecting the representative point objects OB11 to OB16 of the street map, respectively, on the coverage map.

Figure 16:
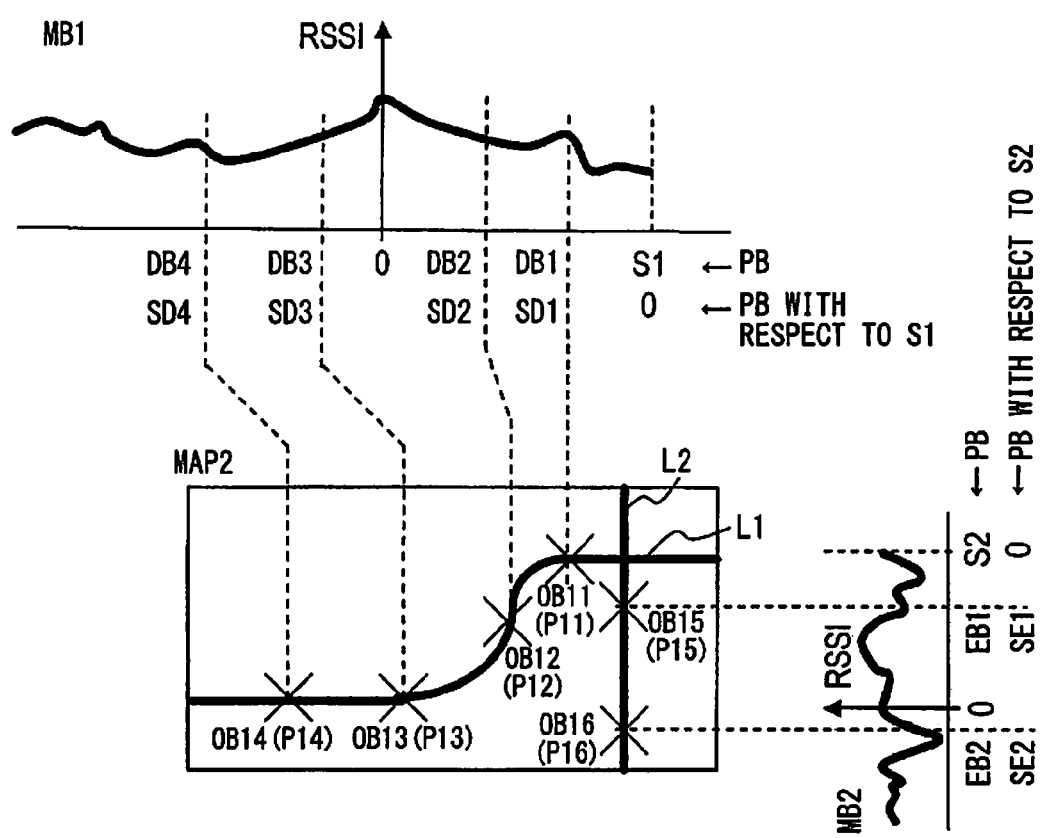
FIG. 16 is a diagram showing a relation between coverage maps and map objects, such as road objects and point objects.

For example, as shown in FIG. 16, the relative coordinate PB of the reference point of the coverage map locus on the coverage map MB1 is defined as S1, and the relative coordinate PB of the reference point of the coverage map locus on the coverage map MB2 is defined as S2. In this example, the reference point is set as the start point of the map coverage locus on the coverage map.

The relative coordinate of the auxiliary point of the coverage map locus on the coverage map is set with respect to the reference point. The auxiliary points on the coverage map MB1 correspond to the representative point objects OB11 to OB14 on the street map, and the auxiliary points on the coverage map MB2 correspond to the representative point objects OB15 and OB16 on the street map. On the coverage map MB1, the auxiliary points corresponding to the representative point objects OB11 to OB14 have respective relative coordinates of DB1 to DB4. On the coverage map MB2, the auxiliary points corresponding to the representative point objects OB15 and OB16 have respective relative coordinates of EB1 and EB2.

In the road table shown in FIG. 15B, the relative position information of the auxiliary point is indicated by a difference obtained by subtracting the relative position information of the reference point from the relative position information of the corresponding auxiliary point. Specifically, the relative coordinates SD1, SD2, SD3, SD4, SE1, SE2 of the auxiliary points are, respectively, indicated by differences obtained by subtracting the corresponding relative coordinate S1, S2 of the reference point from each relative coordinate DB1, DB2, DB3, DB4, EB1, EB2 of the corresponding auxiliary point on the coverage map. As described above, in the present embodiment, the expression of the position information of the auxiliary points, which correspond to the respective representative points of the road on the street map, are different from the foregoing embodiments.

Figure 17:
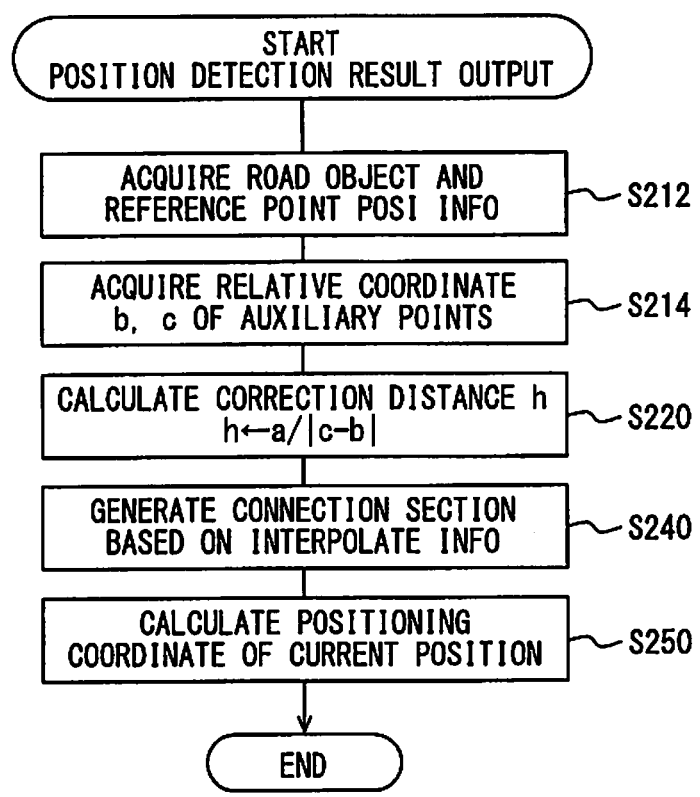
FIG. 17 is a flowchart showing a position detection result output process executed by a vehicular apparatus according to the third embodiment of the present disclosure.

The following will describe a position detection result output process according to the present embodiment with reference to FIG. 17. Similar to the foregoing embodiments, the CPU 351 executes the position detection result output process.

As shown in FIG. 17, when the process starts, at S212, the CPU 351 acquires the road object and the position information of the reference point of the road object from the coverage map table corresponding to the coverage map extracted at S100.

At S214, the CPU 351 refers to the road table shown in FIG. 15B and extracts a relative coordinate b of an auxiliary point positioned immediately prior to the current position of the subject vehicle and a relative coordinate c of an auxiliary point positioned immediately posterior to the current position of the subject vehicle from the coverage map table corresponding to the coverage map extracted at S100. Herein, the auxiliary point positioned immediately prior to the current position and the auxiliary point positioned immediately posterior to the current position are correlated to the road object specified at S212. In the present embodiment, each relative coordinate b, c is obtained by adding the relative coordinate of the reference point of the coverage map locus to the corresponding relative coordinate of the auxiliary point obtained from the road table.

Processes executed at S220, S240, and S250 are similar to the foregoing embodiments, and detailed description will be omitted for simplification.

In the present embodiment, although the configuration of the map database 43 and the expression of position information of the auxiliary point with respective to the reference point are different from the foregoing embodiments, the configuration of the present embodiment can provide advantages similar to the foregoing embodiments.

In the foregoing embodiments, the RAM 353 corresponds to the coverage map storing unit, a process executed by the CPU 351 at S50 corresponds to a reception state detection unit, a process executed by the CPU 351 at S60 corresponds to a distance detection unit, a process executed by the CPU 351 at S70 corresponds to a generation unit, a process executed by the CPU 351 at S100 corresponds to a determination unit, and a process executed by the CPU 351 at S110 corresponds to a calculation unit. The reference station 2 corresponds to a wireless transmission device, and the vehicle corresponds to a moving object.

The present disclosure may be applied to a wireless position detection system, a program product stored in a non-transitory computer readable tangible storage medium and including instructions for wirelessly detection a position of a moving object, a database for the wireless position detection or the like.

(Other Embodiments)

Each component of the present disclosure is merely a conceptual example, and is not limited to the above examples. For example, one component, which has multiple functions, may be divided to multiple components according to the functions. For another example, multiple components having respective functions may be integrated into one component having the multiple functions. As another example, at least a portion of the configuration of the present disclosure may be replaced by a well-known configuration having a similar function. As another example, at least a portion of the configuration of one embodiment may be added to or replaced with a configuration of another embodiment under a condition that the configuration obtained by the addition or replacement is operable.

In the appended claims, information and data are referred to as information element and data element, respectively, in order to clearly express multiple number of data or information.

While only the selected exemplary embodiments have been chosen to illustrate the present disclosure, it will be apparent to those skilled in the art from this disclosure that various changes and modifications can be made therein without departing from the scope of the disclosure as defined in the appended claims. Furthermore, the foregoing description of the exemplary embodiments according to the present disclosure is provided for illustration only, and not for the purpose of limiting the disclosure as defined by the appended claims and their equivalents.

What is claimed is:

1. A wireless position detection apparatus equipped to a moving object, the apparatus comprising:
   a coverage map storing unit storing a coverage map correlated to a plurality of map object data elements and a plurality of position information elements of auxiliary points, the coverage map being preliminarily prepared for a road and indicating reception states of wireless signals along the road, the wireless signals being transmitted from a wireless transmission device, the map object data elements being prepared for respective predetermined map objects positioned along the road, each of the map object data elements including one or more sub data elements each of which indicates a property of the corresponding map object, the one or more sub data elements including at least one position data element that expresses a position of the corresponding map object by a positioning coordinate, the predetermined map objects being correlated to the respective auxiliary points on the coverage map, each of the auxiliary points having the position information element expressed by a relative coordinate on the coverage map;
   a reception state detection unit detecting reception states of wireless signals transmitted from the wireless transmission device in real time;
   a distance detection unit successively detecting moving distances of the moving object;
   a generation unit generating a positioning locus that indicates a relation between the moving distances of the moving object detected by the distance detection unit and the reception states of the wireless signals detected by the detection unit in real time correlated to the road travelled by the moving object;
   a determination unit extracting, from the coverage map, a portion as a target portion when a shape of the positioning locus is similar to a shape of the portion of the coverage map, and the determination unit determining an end point of the target portion as a current position correspondence point of the moving object, the current position correspondence point is a point existing on the coverage map and being correlated to a current position of the moving object; and a calculation unit specifying, on the road, a target point corresponding to the current position correspondence point of the moving object and calculating a positioning coordinate of the target point as a current position information element of the moving object based on (i) a position information element of the current position correspondence point of the moving object on the coverage map, (ii) the position information element of the auxiliary point positioned immediately prior to the current position correspondence point on the coverage map and the position information element of the auxiliary point positioned immediately posterior to the current position correspondence point on the coverage map, and (iii) the position data element of the map object corresponding to the auxiliary point positioned immediately prior to the current position correspondence point on the coverage map and the position data element of the map object corresponding to the auxiliary point positioned immediately posterior to the current position correspondence point on the coverage map.

2. The wireless position detection apparatus according to claim 1, wherein the coverage map storing unit further stores a plurality of interpolation information elements each of which defining a shape of a road segment between adjacent two of the map objects along the road, and the calculation unit specifies the target point on the road that is interpolated based on the interpolation information elements, and calculates the positioning coordinate of the target point.

3. The wireless position detection apparatus according to claim 1, wherein the map objects include a road object that indicates the road travelled by the moving object and a point object that indicates a point positioned along the road, the auxiliary point correlated to the road object has the position information element provided by a position information element of a start correspondence point, and the start correspondence point is a point existing on the coverage map and is correlated to a predetermined start point of the road, and the auxiliary point correlated to the point object has the position information element expressed relative to the start correspondence point on the coverage map.

4. A non-transitory computer readable tangible storage medium used for wirelessly detecting a position of a moving object, the storage medium comprising:

a plurality of coverage maps, the coverage maps being preliminarily prepared for a plurality of roads and each of the coverage maps indicating reception states of wireless signals along the corresponding road, the wireless signals being transmitted from a wireless transmission device, the coverage maps being compared with a positioning locus of the moving object for determining a current position of the moving object, the moving object generating the positioning locus that indicate a relation between moving distances of the moving object and real time reception states of wireless signals transmitted from the transmission device;

a plurality of map object data elements prepared for respective predetermined map objects positioned along each of the roads, each of the map object data elements including one or more sub data elements each of which indicates a property of the corresponding map object, and the one or more sub data elements including at least one position data element that expresses a position of the corresponding map object by a positioning coordinate; and a plurality of position information elements of auxiliary points existing on each of the coverage maps, the predetermined map objects being correlated to the respective auxiliary points on each of the coverage maps, each of the auxiliary points having the position information element expressed by a relative coordinate on the corresponding coverage map, wherein each of the coverage maps is correlated to the map object data elements and the position information elements of the auxiliary points.

5. The storage medium according to claim 4, further comprising a plurality of interpolation information elements each of which defining a shape of a road segment between adjacent two of the map objects along the road.

6. The storage medium according to claim 4, wherein the map objects include a road object that indicates the road travelled by the moving object and a point object that indicates a point positioned along the road, the auxiliary point correlated to the road object has the position information element provided by a position information element of a start correspondence point, and the start correspondence point is a point existing on the coverage map and is correlated to a predetermined start point of the road, and the auxiliary point correlated to the point object has the position information element expressed relative to the start correspondence point on the coverage map.

* * * * *